US010613850B1

(12) United States Patent
Polyudov

(10) Patent No.: US 10,613,850 B1
(45) Date of Patent: Apr. 7, 2020

(54) PERFORMANT AND SECURE STORAGE AND RETRIEVAL OF FIRMWARE VARIABLES

(71) Applicant: American Megatrends International, LLC, Norcross, GA (US)

(72) Inventor: Feliks Polyudov, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/162,120

(22) Filed: Oct. 16, 2018

(51) Int. Cl.
*G06F 8/65* (2018.01)
*G06F 21/57* (2013.01)
*G06F 9/52* (2006.01)
*G06F 9/54* (2006.01)
*G06F 21/79* (2013.01)

(52) U.S. Cl.
CPC ............. *G06F 8/65* (2013.01); *G06F 9/52* (2013.01); *G06F 9/544* (2013.01); *G06F 21/572* (2013.01); *G06F 21/79* (2013.01)

(58) Field of Classification Search
CPC ... G06F 8/65; G06F 9/52; G06F 9/544; G06F 21/572; G06F 21/79
USPC .................................................. 717/168–173
See application file for complete search history.

(56) References Cited

U.S. PATENT DOCUMENTS

| 2007/0033322 | A1* | 2/2007 | Zimmer ............... G06F 9/4401 711/103 |
| 2016/0378576 | A1* | 12/2016 | Jayakumar ............. G06F 9/544 719/312 |
| 2017/0372076 | A1* | 12/2017 | Poornachandran ... G06F 21/575 |
| 2018/0004506 | A1* | 1/2018 | Annapureddy ......... G06F 8/654 |
| 2018/0157868 | A1* | 6/2018 | Karivaradaswamy ...................... G06F 13/1673 |

\* cited by examiner

*Primary Examiner* — Qing Chen
(74) *Attorney, Agent, or Firm* — Newport IP, LLC

(57) ABSTRACT

A first firmware component executes from a secure memory and a second firmware component executes from a non-secure memory. The first firmware component receives a request to store data in a non-volatile (NV) memory. In response to the request, the first firmware component stores the data in the NV memory and in a buffer located in the secure memory. The first firmware component also copies the buffer to non-secure memory. The first firmware component provides an indication to the second firmware component that the buffer was updated. The second firmware component can then update an internal data structure identifying the start, end, or size of the data stored in the buffer. Once the internal data structure is updated, the second firmware component can respond to requests to retrieve firmware variables of other types of data without accessing buffers in secure memory.

20 Claims, 6 Drawing Sheets

GET VARIABLE

PERFORMANT AND SECURE STORAGE AND RETRIEVAL OF FIRMWARE VARIABLES

BACKGROUND

In order to support the execution of different types of programs, computing system firmware commonly provides various types of boot and runtime services. For example, a service might be provided through which firmware programs, operating systems, and application programs can store and retrieve variables. Such variables can include both volatile firmware variables that do not persist following restarts and non-volatile ("NV") firmware variables stored in NV random access memory ("NVRAM") or another type of NV storage device that are persisted between reboots of a computing system.

Firmware variables such as those described above are commonly stored in secure memory in order to maintain their security. Similarly, firmware services for getting and setting firmware variables commonly execute from secure memory. Due to the overhead associated with secure storage and retrieval, operations for reading and writing firmware variables to and from secure memory can consume a relatively large number of processor cycles, which can negatively impact the performance of a computing system.

It is with respect to these and other considerations that the disclosure made herein is presented.

SUMMARY

Technologies are described herein for performant and secure storage and retrieval of firmware variables or other types of firmware data. Through implementations of the disclosed technologies, a firmware can store and retrieve firmware variables and other types of firmware data in a manner that is both secure and performant. As a result, the performance of computing systems implementing the disclosed technologies can be improved. Technical benefits other than those specifically mentioned herein can also be realized through implementations of the disclosed technologies.

In order to provide these technical benefits, a computing system firmware is provided that is configured for performant and secure storage and retrieval of firmware variables and other types of data utilized by a firmware. In particular, the firmware disclosed herein can provide a service that enables firmware components to retrieve and store data such as, but not limited to, firmware variables. In this regard, it is to be appreciated that while the configurations disclosed herein are primarily described and illustrated in the context of the storage and retrieval of firmware variables, other types of data can be stored and retrieved utilizing the disclosed configurations.

The disclosed firmware includes a firmware component that executes from a secure memory. This firmware component is implemented as a unified extensible firmware interface ("UEFI") platform initialization ("PI") system management mode ("SMM") driver in some configurations. As known to those skilled in the art, SMM is a special-purpose operating mode provided by some processors for handling system-wide functions like power management, system hardware control, or proprietary code. SMM mode is entered by issuing a system management interrupt ("SMI").

The disclosed firmware also includes a firmware component that executes from a non-secure memory, such as system random access memory ("RAM"). This firmware component is implemented as a UEFI PI driver execution environment ("DXE") driver in some configurations.

The firmware components executing in the secure memory and in the non-secure memory can receive and respond to requests to store, or "set," and retrieve, or "get," firmware variables or other types of data. Requests to store or retrieve firmware variables or other types of data that are generated by an operating system and non-secure firmware components (e.g. non-SMM firmware components) are provided to the firmware component executing in the non-secure memory. Requests to store or retrieve firmware variables or other types of data that are generated by secure firmware components (e.g. SMM firmware components) are provided to the firmware component executing in the secure memory. Requests to set firmware variables or other types of data received by the firmware component executing in the non-secure memory are forwarded to the firmware component executing in the secure memory.

In one particular example, the firmware component executing in the secure memory can receive a request to store data, such as a value for a firmware variable, in a NV memory, such as that provided by an NVRAM. Data stored in NV memory is retained following the shutdown or rebooting of a computing system. In response to such a request, the firmware component executing in the secure memory can store the data in the non-volatile memory device. The firmware component can also store the data in a buffer located in the secure memory. The data in the buffer can be used to speed up processing of the subsequent data retrieval requests.

In order to synchronize the buffer in the secure memory with the buffer in the non-secure memory, the firmware component executing in the secure memory can also copy the buffer to non-secure memory that is accessible to the firmware component executing in the non-secure memory. The firmware component executing in the secure memory can then provide an indication to the firmware component executing in the non-secure memory that the buffer in the non-secure memory was updated. The indication might, for example, be provided by way of a data structure accessible to the firmware component executing in the secure memory and the firmware component executing in the non-secure memory. Responsive to receiving the indication that the buffer was updated, the firmware component executing in the non-secure memory can update one or more internal data structures such as, but not limited to, data structures identifying the start, end, or size of the data stored in the updated buffer.

Requests might also be received at the firmware component executing in the secure memory to store data like firmware variables in the secure memory. Data stored in the secure memory is volatile and will not be retained following the shutdown or rebooting of a computing system. In response to such a request, the firmware component executing in the secure memory stores the data in a second buffer in the secure memory.

In order to synchronize the second buffer in the secure memory with a copy of the second buffer in the non-secure memory, the firmware component executing in the secure memory also copies the second buffer to the non-secure memory. The firmware component executing in the secure memory can then provide an indication to the firmware component executing in the non-secure memory that the second buffer in the non-secure memory was updated. The indication might, for example, be provided by way of a data structure accessible to the firmware component executing in the secure memory and the firmware component executing in the non-secure memory. Responsive to receiving the indication that the second buffer was updated, the firmware component executing in the non-secure memory can update one or more internal data structures such as, but not limited to, data structures identifying the start, end, or size of the data stored in the second buffer.

The firmware components executing in the secure memory and non-secure memory can also receive requests to retrieve a value for a firmware variable or other type of data. When the firmware component executing in the secure memory receives a request to retrieve data, it retrieves the data from the appropriate buffer (i.e. the first buffer or the second buffer) stored in the secure memory. When the firmware component executing in the non-secure memory receives a request to retrieve data, it retrieves the data from the appropriate buffer (i.e. the first buffer or the second buffer) stored in the non-secure memory. The requested data can then be returned in response to the retrieval request.

In some configurations, the firmware component executing in the secure memory and the firmware component executing in the non-secure memory can provide an indication to one another to discontinue (i.e. shutdown) synchronization of the buffers between the secure memory and the non-secure memory in the manner described above. In response to such a request, the firmware component executing in the secure memory and the firmware component executing in the non-secure memory will stop synchronizing the buffers. This might occur, for example, if the size of data stored in a NV memory device changes.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for performant and secure storage and retrieval of firmware variables and other types of data. As discussed briefly above, implementations of the disclosed technologies can improve computing system performance when storing or retrieving firmware variables or other types of firmware data. Technical benefits other than those specifically mentioned herein can also be realized through implementations of the disclosed technologies.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
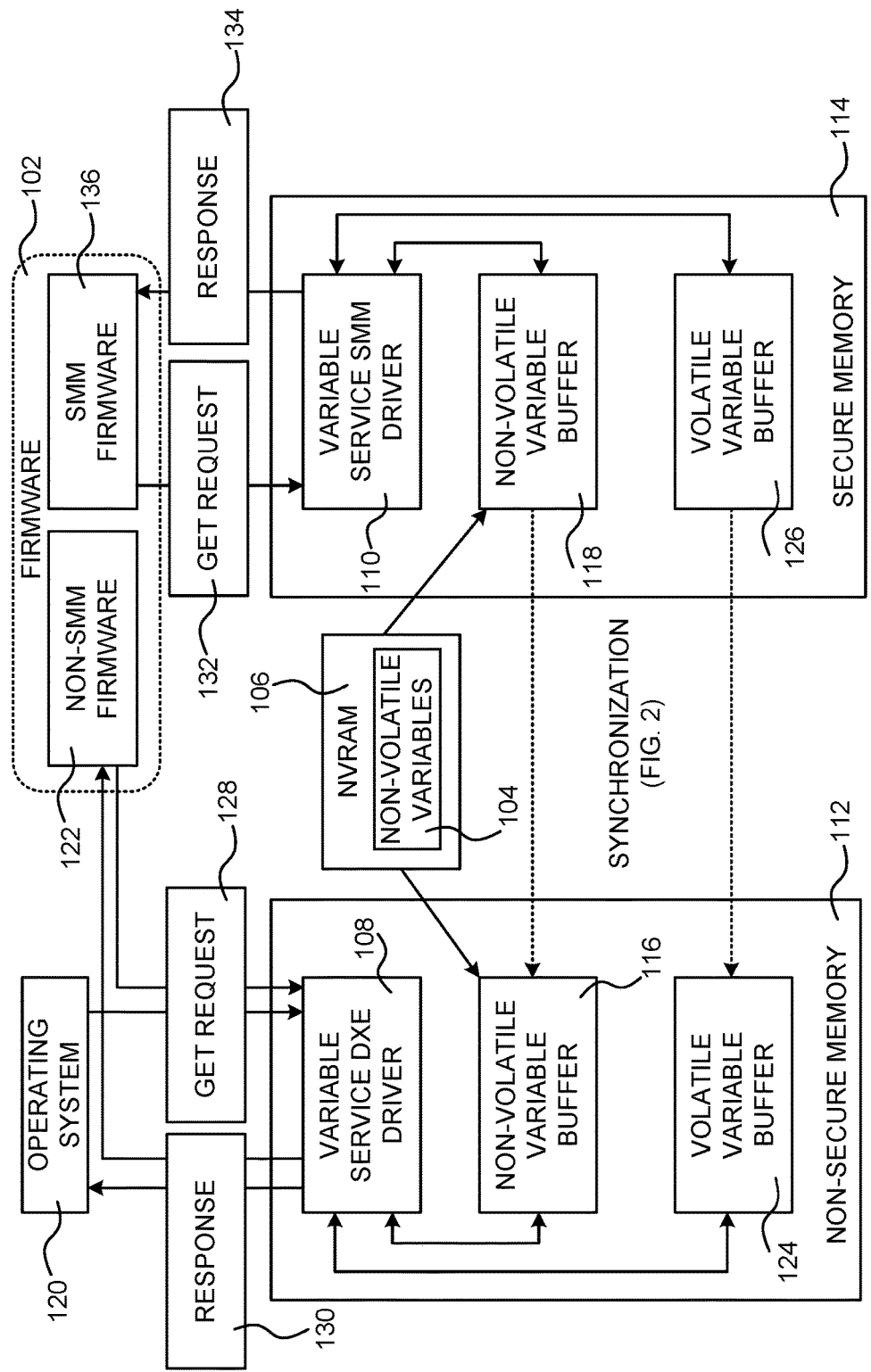
FIGS. 1 and 2 are software architecture diagrams illustrating aspects of a mechanism for performant and secure storage and retrieval of firmware variables, according to one or more embodiments presented herein.
Figure 2:
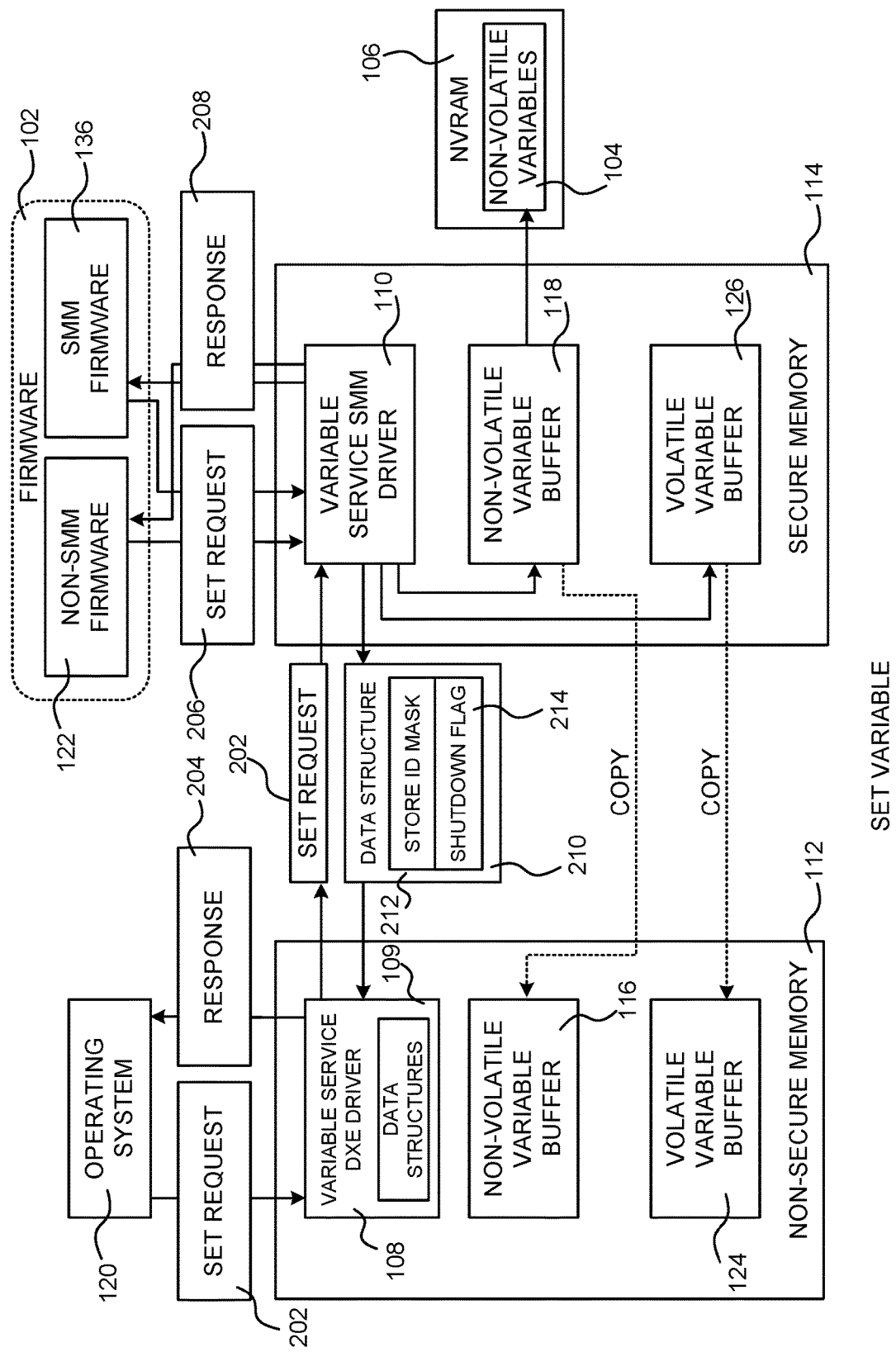

FIGS. 1 and 2 are software architecture diagrams illustrating aspects of a mechanism for performant and secure storage and retrieval of firmware variables and other types of data utilized by a firmware, according to one or more embodiments presented herein. In particular, FIG. 1 illustrates one configuration of a computing system firmware 102 that implements aspects of the disclosed technologies. The firmware 102 shown in FIG. 1 and described herein is compliant with the UEFI Specification, which is described in greater detail below with regard to FIG. 6. The disclosed technologies can, however, be implemented in other types of firmware in other configurations.

As shown in FIG. 1, the firmware 102 can store, retrieve, and utilize NV variables 104 stored in an NVRAM 106 or another type of NV memory device. The NV variables 104 might, for example, be firmware variables defining aspects of the configuration of a computing system executing the firmware 102. The NV variables 104 might be loaded by the computing system upon power-up or reboot in order to configure the computing system. Upon startup of such a computing system, the NV variables 104 can be copied to buffers in RAM in order to speed up access to the NV variables 104. In the example shown in FIG. 1, for instance, the NV variables 104 have been copied to a NV variable buffer 118 in a secure memory 114 and to a NV variable buffer 116 in a non-secure memory 112.

As discussed briefly above, the firmware 102 can also provide a service that enables firmware components, such as UEFI drivers or protocols, to retrieve and store data such as, but not limited to, the NV variables 104. The service can also enable firmware components to retrieve and store data that is not-retained following the reboot or power-down of a computing system. In this regard, firmware variables that are stored in a non-volatile memory device, such as the NVRAM 106, might be referred to herein as "NV variables" (e.g. the NV variables 104), while firmware variables that are stored in volatile memory might be referred to herein as "volatile variables." Upon initialization of the firmware 102, buffers can be created in the non-secure memory 112 and the secure memory 114 for storing volatile variables (e.g. the volatile variable buffer 124 in the non-secure memory and the volatile variable buffer 118 in the secure memory 114).

In order to get or set firmware data stored in the secure memory 114, the firmware 102 provides a firmware component that executes from within the secure memory 114. In the illustrated example, this component is a UEFI PI SMM driver (i.e. the variable service SMM driver 110) and the secure memory 114 is system management RAM ("SM-RAM"). As known to those skilled in the art, SMM is a special-purpose operating mode provided by some processors for handling system-wide functions like power management, system hardware control, or proprietary code. SMM mode is entered by issuing a SMI. In this regard it is to be appreciated that an SMM driver is but one implementation and that other types of firmware components can be utilized in other firmware implementations.

The disclosed firmware 102 also includes a firmware component that executes from a non-secure memory 112, such as system RAM. In the illustrated example, this firmware component is implemented as a UEFI PI DXE driver 108. This component might be implemented in other ways in other firmware environments.

The firmware components executing in the secure memory and in the non-secure memory (e.g. the SMM driver 110 and the DXE driver 108) can receive and respond to requests to set and get firmware variables or other types of data. As shown in FIG. 1, requests 128 to retrieve firmware variables or other types of data that are generated by an operating system 120 and non-secure firmware components (e.g. the non-SMM firmware components 122) are provided to the firmware component executing in the non-secure memory (e.g. the DXE driver 108). Requests to retrieve firmware variables or other types of data (e.g. request 132) that are generated by secure firmware components (e.g. SMM firmware 136) are provided to the firmware component executing in the secure memory (e.g. the SMM driver 110).

Requests to set firmware variables or other types of data received by the firmware component executing in the secure memory (e.g. the SMM driver 110) are handled by that component. Requests to set firmware variables or other types of data received by the firmware component executing in the non-secure memory (e.g. the DXE driver 108) are forwarded to the firmware component executing in the secure memory (e.g. the SMM driver 110) for handling (illustrated in FIG. 2 and described further below).

When a request 128 is received by the firmware component executing in the non-secure memory (e.g. the DXE driver 108) to get a firmware variable or other type of data, the requested data is retrieved from the buffer 116 or the buffer 124 in the non-secure memory 112, depending upon whether the request is for an NV variable or a volatile variable. The component executing in the non-secure memory (e.g. the DXE driver 108) then generates a response 130 to the request 128 that includes the requested data (e.g. a value for a previously-stored firmware variable). Because requests 128 received from the operating system 120 and non-secure firmware components (e.g. the non-SMM firmware 122) can be satisfied from non-secure memory (e.g. system RAM), responses 130 can be generated more quickly than if the requests 128 were satisfied from the secure memory 114.

When a request 132 is received by the firmware component executing in the secure memory (e.g. the SMM driver 110) to get a firmware variable or other type of data, the requested data is retrieved from the buffer 118 or the buffer 126 in the secure memory 114, depending upon whether the request is for an NV variable or a volatile variable. The firmware component executing in the secure memory (e.g. the SMM driver 110) then generates a response 134 to the request 132 that includes the requested data (e.g. a value for a previously-stored firmware variable). Because requests 132 received from secure firmware components (e.g. the SMM firmware 122) are satisfied from secure memory (e.g. the secure memory 114), secure responses 134 to the requests 132 can be guaranteed.

In order to provide consistent responses to certain requests 128 from non-secure memory 112 and other requests 132 from secure memory 114, the buffers utilized to store data in the secure memory 114 and the non-secure memory 112 are synchronized. In the illustrated configuration, for example, the buffer 118 in the secure memory 114 for storing NV variables is copied to a buffer 116 in the non-secure memory 112. Similarly, the buffer 126 in the secure memory 114 for storing volatile variables is copied to a buffer 124 in the non-secure memory 112. Additional details regarding one implementation of this process is provided below with regard to FIG. 2.

FIG. 2 illustrates one mechanism for setting firmware variables or other types of data. FIG. 2 also illustrates one mechanism for synchronizing buffers stored in secure memory 114 with buffers stored in non-secure memory 112 to enable retrieval of firmware variables or other types of firmware data from either secure memory 114 or non-secure memory 112.

As shown in FIG. 2, requests 202 and 206 to set firmware variables generated by non-secure firmware components (e.g. the non-SMM firmware 122) and by secure firmware components (e.g. the SMM firmware 136) are provided to the firmware component executing in the secure memory 114 (e.g. the SMM driver 110 in the illustrated configuration). Requests 202 to set firmware variables or other types of data received by the firmware component executing in the non-secure memory 112 (e.g. the DXE driver 108) are forwarded to the firmware component executing in the secure memory 114 for handling.

In one particular example, the firmware component executing in the secure memory (e.g. the SMM driver 110) can receive a request 206 to store data such as an NV variable in a non-volatile memory device such as the NVRAM 106. In response to such a request, the firmware component executing in the secure memory (e.g. the SMM driver 110) can store the data in the non-volatile memory device (e.g. the NVRAM 106). The firmware component can also store the data in a buffer located in the secure memory 114. In the illustrated example, the data is stored in the NV variable buffer 118. In this manner, the contents of the NVRAM 106 and the NV variable buffer 118 are kept in synchronization.

In order to synchronize the buffer in the secure memory with the corresponding buffer in the non-secure memory, the firmware component executing in the secure memory (e.g. the SMM driver 110) can also copy the contents of the buffer to non-secure memory 112 accessible to the firmware component executing in the non-secure memory. In the illustrated example, the SMM driver 110 copies the contents of the NV variable buffer 118 stored in the secure memory 114 to the NV variable buffer 116 in the non-secure memory 112.

The firmware component executing in the secure memory (e.g. the SMM driver 110) can also provide an indication to the firmware component executing in the non-secure memory (e.g. the DXE driver 108) that the buffer in the non-secure memory was updated. The indication might, for example, be provided by way of a data structure 210 shared between the firmware component executing in the secure memory and the firmware component executing in the non-secure memory. In the illustrated example, the SMM driver 110 sets a bit in a store identifier ("ID") bit mask 212 indicating that the NV variable buffer 116 in the non-secure memory 112 has been updated. The store ID mask 212 can be implemented as an N-bit value in order to enable the provision of indications that N different buffers have been updated.

Responsive to receiving an indication that the buffer was updated, the firmware component executing in the non-secure memory (e.g. the DXE driver 108) can update one or more internal data structures 109 such as, but not limited to, data structures 109 identifying the start, end, or size of the data stored in the updated buffer. A response 204 or 208 can also be provided to the set request 202 or 206 indicating that the requested operation was successful.

Requests might also be received at the firmware component executing in the secure memory (e.g. the SMM driver 110) to store data such as volatile firmware variables in the secure memory 114. As discussed above, volatile firmware variables are not stored in the non-volatile memory. In response to receiving such a request, the firmware component executing in the secure memory stores the data in a second buffer in the secure memory 114. In the illustrated example, the SMM driver 110 stores a volatile firmware variable in the volatile variable buffer 126.

In order to synchronize the second buffer in the secure memory 114 with the copy of the second buffer in the non-secure memory 112, the firmware component executing in the secure memory (e.g. the SMM driver 110) also copies the second buffer to the non-secure memory 112. In the illustrated example, the SMM driver 110 copies the contents of the volatile variable buffer 126 in the secure memory 114 to the volatile variable buffer 124 in the non-secure memory 112.

The firmware component executing in the secure memory (e.g. the SMM driver 110) can then provide an indication to the firmware component executing in the non-secure memory (e.g. the DXE driver 108) that the second buffer in the non-secure memory 112 was updated. The indication might, for example, be provided by way of the data structure 210, which is shared between the firmware component executing in the secure memory and the firmware component executing in the non-secure memory. In the illustrated example, the SMM driver 110 sets a bit in the store ID mask 212 indicating that the volatile variable buffer 124 in the non-secure memory 112 has been updated.

Responsive to receiving the indication that the second buffer was updated, the firmware component executing in the non-secure memory (e.g. the DXE driver 108) can update its internal data structures 109 such as, but not limited to, data structures 109 identifying the start, end, or size of the data stored in the second buffer (e.g. the volatile variable buffer 124). A response 204 or 208 can also be provided to the set request 202 or 206 indicating that the requested operation was successful.

In some configurations, the firmware component executing in the secure memory and the firmware component executing in the non-secure memory can provide an indication to one another to discontinue synchronization (i.e. shutdown) of the buffers between the secure memory 114 and the non-secure memory 112 in the manner described above. In the illustrated configuration, for example, the shared data structure 210 also includes a one-bit shutdown flag 214 that can be set to indicate that synchronization of the buffers should be stopped. If the firmware component executing in the secure memory or the firmware component executing in the non-secure memory determines that the shutdown flag 214 has been set, synchronization of buffers between the secure memory 114 and the non-secure memory 112 will be stopped. This might occur, for example, if the size of data stored in a NV memory device changes. Additional details regarding this aspect will be provided below with regard to FIG. 3.

Figure 3:
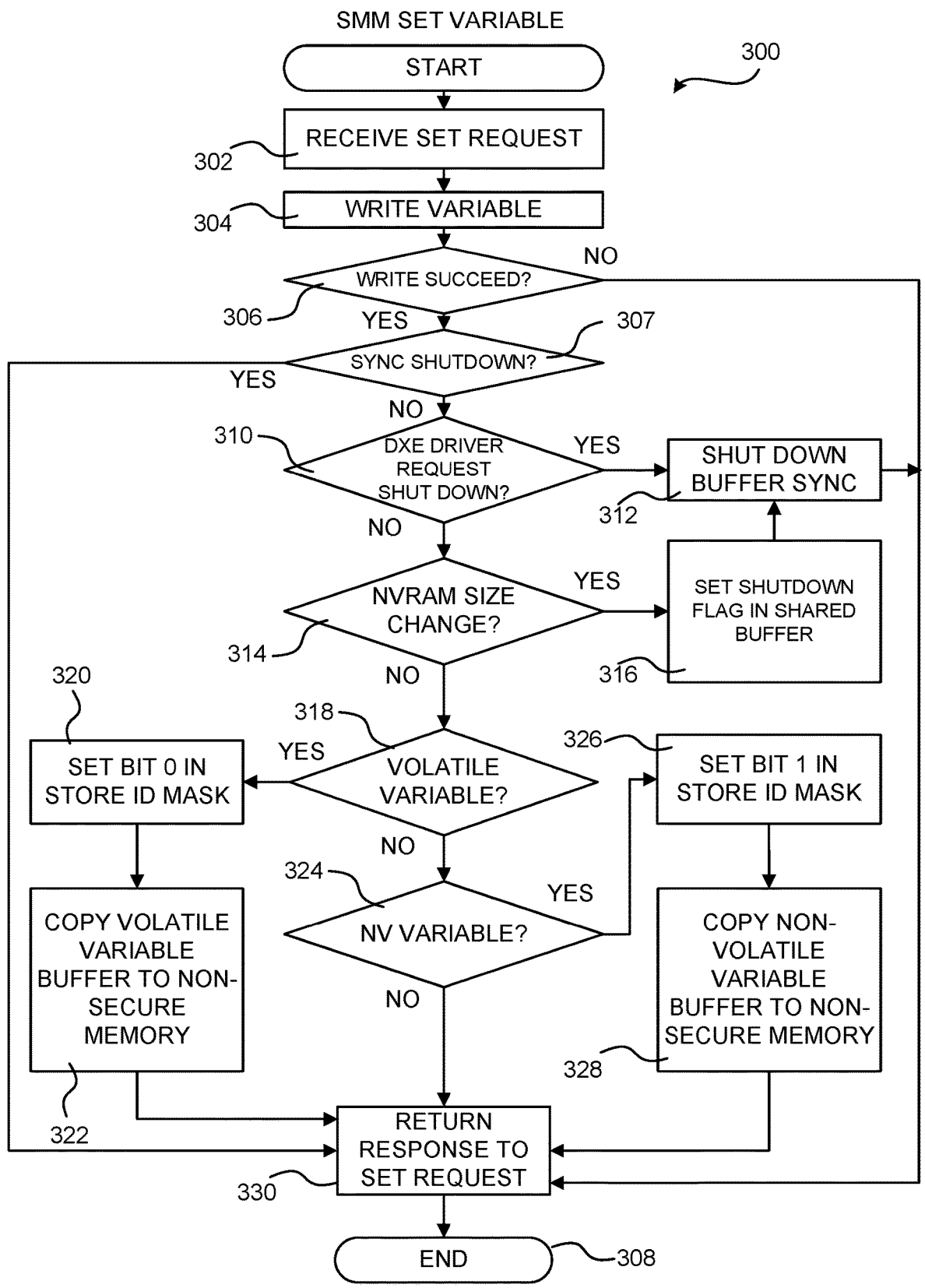
FIGS. 3 and 4 are flow diagrams showing routines that illustrate aspects of the operation of the computing system firmware shown in FIGS. 1 and 2 for performant and secure storage and retrieval of firmware variables, according to one embodiment presented herein.
Figure 4:
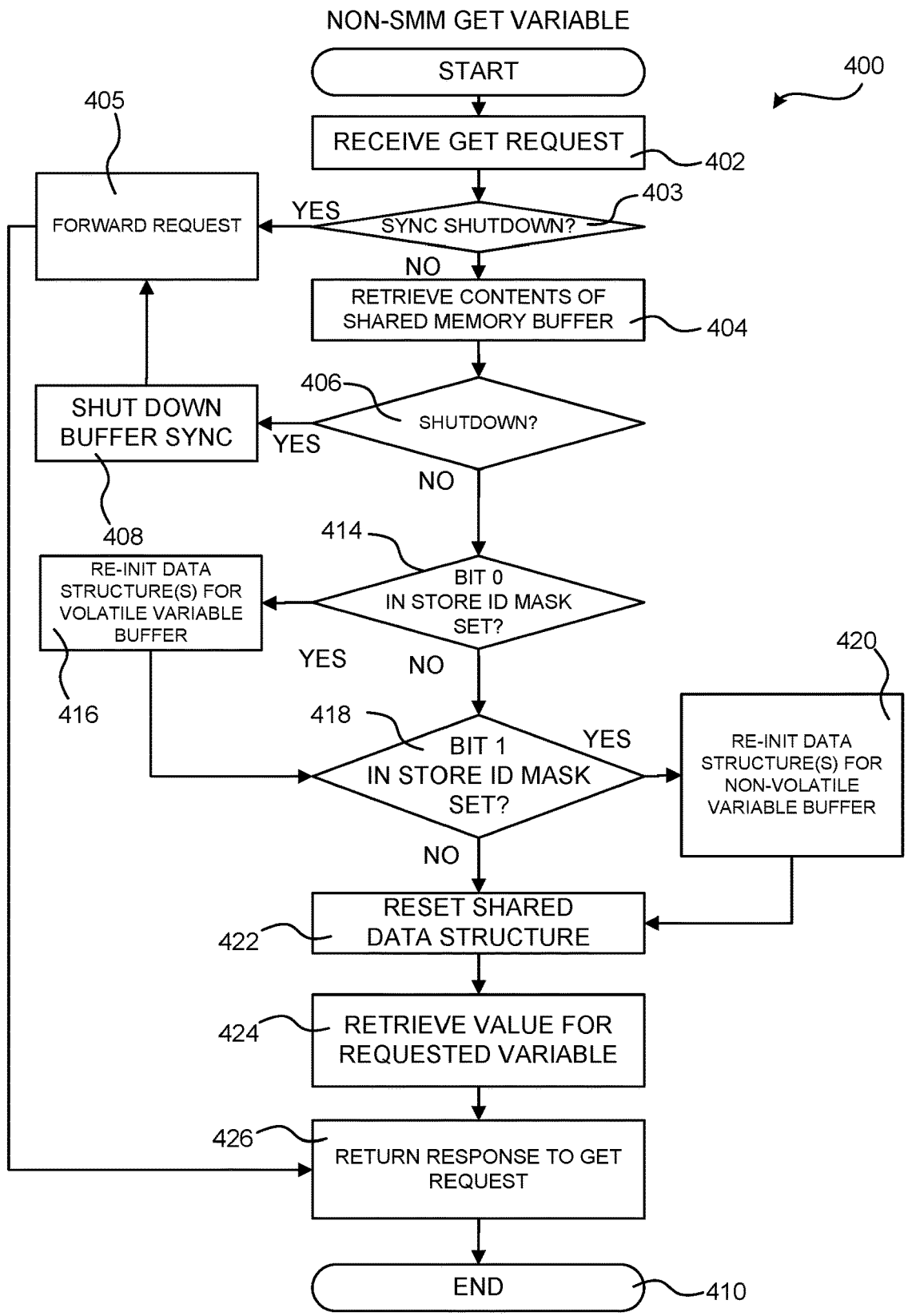

FIGS. 3 and 4 are flow diagrams showing routines 300 and 400, respectively, that illustrate aspects of the operation of the computing system firmware shown in FIGS. 1 and 2 for performant and secure storage and retrieval of firmware variables and other types of data utilized by a firmware, according to one embodiment presented herein. It is to be appreciated that the logical operations described herein with respect to FIGS. 3 and 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 shown in FIG. 3 illustrates one method for setting firmware variables or other types of firmware data. The routine 300 begins at operation 302, where the firmware component executing in the secure memory 114 (e.g. the variable service SMM driver 110) receives a set request 202 from the firmware component executing in the non-secure memory 112 or a set request 206 from a component executing in the firmware 102 (e.g. the SMM firmware 136 or the non-SMM firmware 122).

In response to receiving a set request 202 or 206, the routine 300 proceeds from operation 302 to operation 304. If the request 202 or 206 is for setting a non-volatile variable 104, the component executing in the secure memory 114 writes the value specified in the request 202 or 206 to the NVRAM 106 and to the NV variable buffer 118 at operation 304. If the request 202 or 206 is for setting a volatile variable, the component executing in the secure memory 114 writes the value specified in the request the volatile variable buffer 118 at operation 304. The routine 300 then proceeds from operation 304 to operation 306.

At operation 306, the component executing in the secure memory 114 determines whether the write operation was successful. If the write operation was not successful, the routine 300 proceeds from operation 306 to operation 330, where a response 204 or 208 might be provided to the requesting component indicating that the set request failed. The routine proceeds from operation 330 to operation 308, where it ends.

If the write performed at operation 304 succeeded, the routine 300 proceeds from operation 306 to operation 307. At operation 307, the component executing in the secure memory 114 determines whether synchronization of variables was shut down during processing of one of the prior requests. If so, the routine 300 proceeds from operation 307 to operation 330, where a response 204 or 208 might be provided to the requesting component indicating that the set request processing has been completed. The routine proceeds from operation 330 to operation 308, where it ends.

If synchronization has not been previously shut down, the routine 300 proceeds to operation 310, where the component executing in the secure memory 114 determines if the component executing in the non-secure memory 112 has requested that synchronization of variables be stopped. As discussed above, such a request can be provided by setting the shutdown flag 214. If shutdown has been requested, the routine 300 proceeds from operation 310 to operation 312, where the component executing in the secure memory 114 stops synchronization of the buffers. After shutdown, the component executing in the secure memory 114 does not update the buffers stored in the non-secure memory 112 nor does it make changes to the data structure 210, which is shared between the firmware component executing in the secure memory and the firmware component executing in the non-secure memory. The routine 300 then proceeds from operation 312 to operation 330, where a response 204 or 208 might be provided to the requesting component indicating that the set request processing has been completed. The routine proceeds from operation 330 to operation 308, where it ends.

If a request to stop buffer synchronization has not been received, the routine 300 proceeds from operation 310 to operation 314, where the component executing in the secure memory 114 determines if there has been a change to the size of the NVRAM or another event that would require shutting down buffer synchronization. If so, the routine 300 proceeds from operation 314 to operation 316, where the component executing in the secure memory 114 sets the shutdown flag 214 to indicate to the component executing in the non-secure memory 112 should stop synchronization of buffers. The routine 300 then proceeds from operation 316 to operations 312, 330, and 308, which were described above.

If the size of the NVRAM has not changed, the routine 300 proceeds from operation 314 to operation 318, where a determination is made as to whether the variable stored at operation 304 was a volatile variable. If so, the routine 300 proceeds from operation 318 to operation 320, where the component executing in the secure memory 314 sets a bit in the store ID bit mask 212 to indicate that the buffer 116 has been changed. The component executing in the secure memory 114 also copies the contents of the volatile variable buffer 126 to the volatile variable buffer 124 in the non-secure memory 112. The routine 300 then proceeds from operation 322 to operation 330, where a response can be provided to the set request.

If the written variable is a non-volatile variable, the routine 300 proceeds from operation 324 to operation 326, where the component executing in the secure memory 314 sets a bit in the store ID bit mask 212 to indicate that the buffer 126 has been changed. The component executing in the secure memory 114 also copies the contents of the non-volatile variable buffer 118 to the non-volatile variable buffer 116 in the non-secure memory 112. The routine 300 then proceeds from operation 322 to operation 330, where the component executing in the secure memory 114 returns a response 208 or 204 to the set request 206 or 202, respectively. The routine 300 then proceeds to operation 308, where it ends.

The routine 400 shown in FIG. 4 illustrates one method for getting, or retrieving, firmware variables or other types of firmware data. The routine 400 begins at operation 402, where the component executing in the non-secure memory 112 (e.g. the variable service DXE driver 108) receives a get request 128. In response to receiving such a request 128, the routine 400 proceeds from operation 402 to operation 403, where the component executing in the non-secure memory 112 determines if variable synchronization was previously shut down. If so, the routine 400 proceeds from operation 403 to operation 405, where the component executing in the non-secure memory forwards the get request 128 to the component executing in the secure memory 114 for processing. The routine 400 then proceeds from operation 405 to operation 426, where the firmware component executing in the secure memory can respond to the get request received at operation 402. The routine 400 then proceeds from operation 426 to operation 410, where it ends.

If synchronization was not previously shut down, the routine 400 proceeds from operation 403 to operation 404, where the component executing in the non-secure memory 112 retrieves the contents of the data structure 210, which is shared between the firmware component executing in the secure memory and the firmware component executing in the non-secure memory.

The routine 400 then proceeds from operation 404 to operation 406, where the component executing in the non-secure memory 112 determines if the shutdown flag 214 indicates that buffer synchronization is to be stopped. If so, the routine 400 proceeds from operation 406 to operation 408, where synchronization is stopped. After synchronization is stopped, the component executing in the non-secure memory (e.g. the DXE driver 108) does not utilize the buffers 116 and 124 stored in the non-secure memory. Rather, the component executing in the non-secure memory 112 forwards get requests 128 to the component executing in the secure memory 114 (this occurs at operation 405, as described above). In this way, get requests 128 are satisfied from data stored in the buffers 118 and 126.

If buffer synchronization is not to be stopped, the routine 400 proceeds from operation 406 to operation 414, where a determination is made as to whether the store ID bit mask 212 indicates that data structures 109 storing data relating to the volatile variable buffer 124 are to be updated (bit 0 of the store ID mask 212 in some implementations). If so, the routine 400 proceeds from operation 414 to operation 416, where the component executing in the non-secure memory 112 updates its internal data structures 109 relating to the volatile variable buffer 124. As discussed above, these data structures 109 might store data such as, but not limited to, data structures 109 identifying the start, end, or size of the data stored in the volatile variable buffer 124. The routine 400 then proceeds from operation 416 to operation 418.

At operation 418, a determination is made as to whether the store ID bit mask 212 indicates that data structures 109 storing data relating to the non-volatile variable buffer 116 are to be updated (bit one of the store ID bit mask 212 in some implementations). If so, the routine 400 proceeds from operation 418 to operation 420, where the component executing in the non-secure memory 112 updates its internal data structures 109 relating to the non-volatile variable buffer 116. As discussed above, these data structures 109 might store data such as, but not limited to, data structures 109 identifying the start, end, or size of the data stored in the non-volatile variable buffer 116. The routine 400 then proceeds from operation 420 to operation 422.

At operation 422, the component executing in the non-secure memory 112 resets the data structure 210, which is shared between the firmware component executing in the secure memory and the firmware component executing in the non-secure memory such as, for instance, resetting the bits of the stored ID bit mask 212 and the shutdown flag 214. The routine 400 then proceeds from operation 424, where the component executing in the non-secure memory retrieves the value for the variable requested in the get request 128 from either the non-volatile variable buffer 116 (i.e. if the request is for a NV variable 104) or from the volatile variable buffer 124 (i.e. if the request is for a volatile variable).

From operation 424, the routine 400 proceeds to operation 426, where the component executing in the non-secure memory 112 returns the retrieved value in a response 130 to the get request 128. The routine 400 then proceeds from operation 426 to operation 410, where it ends.

Figure 5:
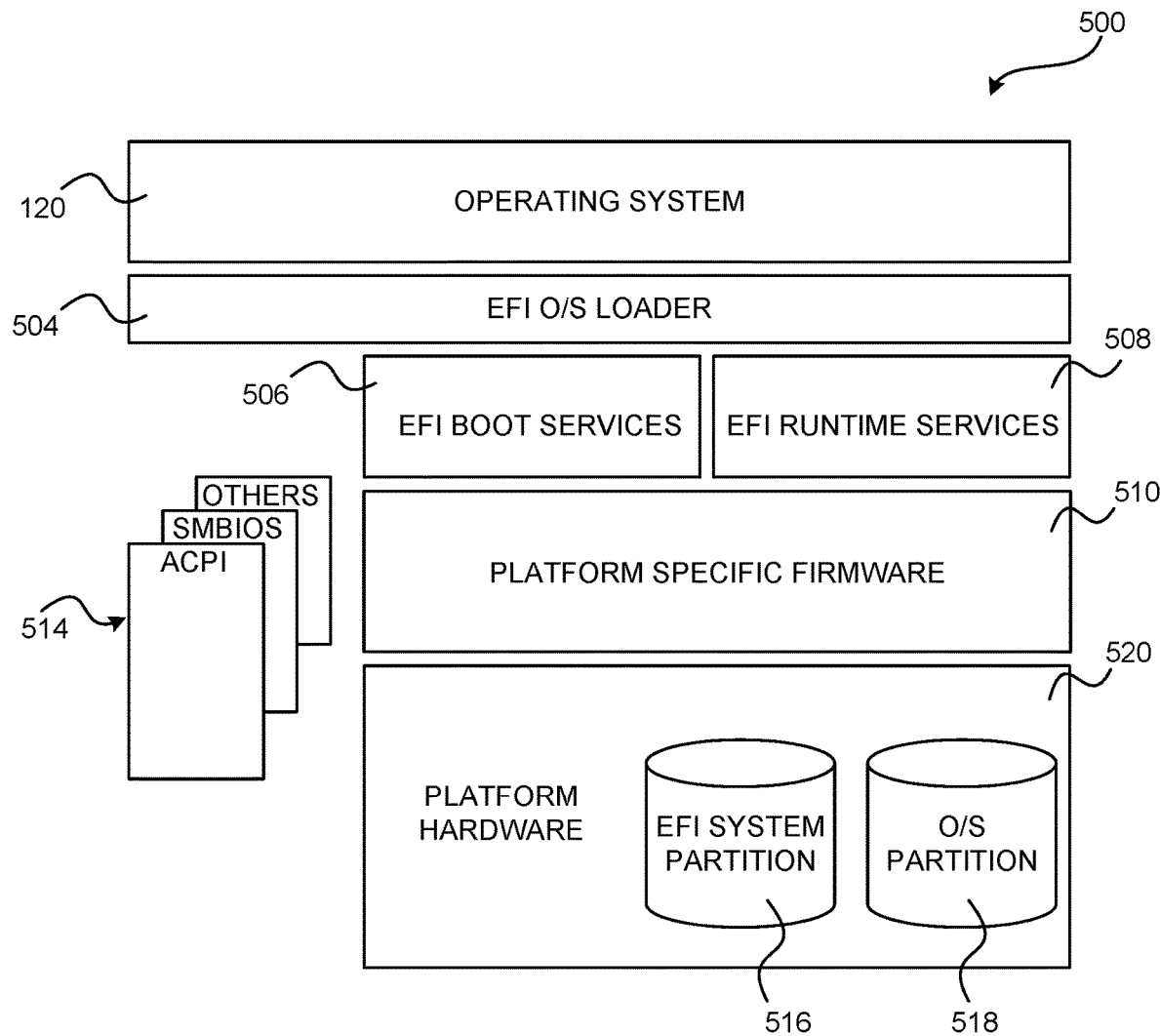
FIG. 5 is a software architecture diagram illustrating a software architecture for a UEFI-compliant firmware that provides an operating environment for aspects of the technologies presented herein in one embodiment.

Turning now to FIG. 5, a software architecture diagram will be described that illustrates an architecture 500 for a UEFI Specification-compliant firmware 102 that can be configured to provide and/or utilize aspects of the technologies disclosed herein. In particular, the firmware architecture 500 shown in FIG. 5 can be utilized to implement the firmware 102 described above. The firmware 102 can also be implemented in other ways in other configurations.

The UEFI Specification describes an interface between an operating system 120 and a UEFI Specification-compliant firmware 102. The UEFI Specification also defines an interface that a firmware 102 can implement, and an interface that an operating system ("OS") 120 can use while booting. How a firmware implements the interface can be left up to the manufacturer of the firmware. The UEFI Specification also defines a way for an operating system 120 and a firmware 102 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 5, the architecture can include platform hardware 520, such as that described below with regard to FIG. 5, an operating system 120, and a UEFI system partition 516. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 120. In doing so, the UEFI OS loader 504 can use UEFI boot services 506, UEFI runtime services 508, and an interface to other supported specifications, to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase and can provide interfaces, such as the variable storage and retrieval services described above. UEFI allows extension of platform firmware by loading UEFI driver and UEFI application images which, when loaded, have access to UEFI-defined runtime and boot services such as those described above.

Additional details regarding the operation and architecture of a UEFI Specification-compliant firmware can be found in the UEFI Specification which is available from the UEFI Forum. UEFI Forum has also provided further details regarding recommended implementation of UEFI in the form of the Platform Initialization ("PI") Specification. Unlike the UEFI Specification, which focuses on programmatic interfaces for the interactions between the operating system 120 and system firmware 102, the PI specification describes a firmware implementation that has been designed to perform the full range of operations that are required to initialize a platform from power on through transfer of control to the operating system 120. The PI specification, which is available from UEFI Forum, is also expressly incorporated herein by reference.

Figure 6:
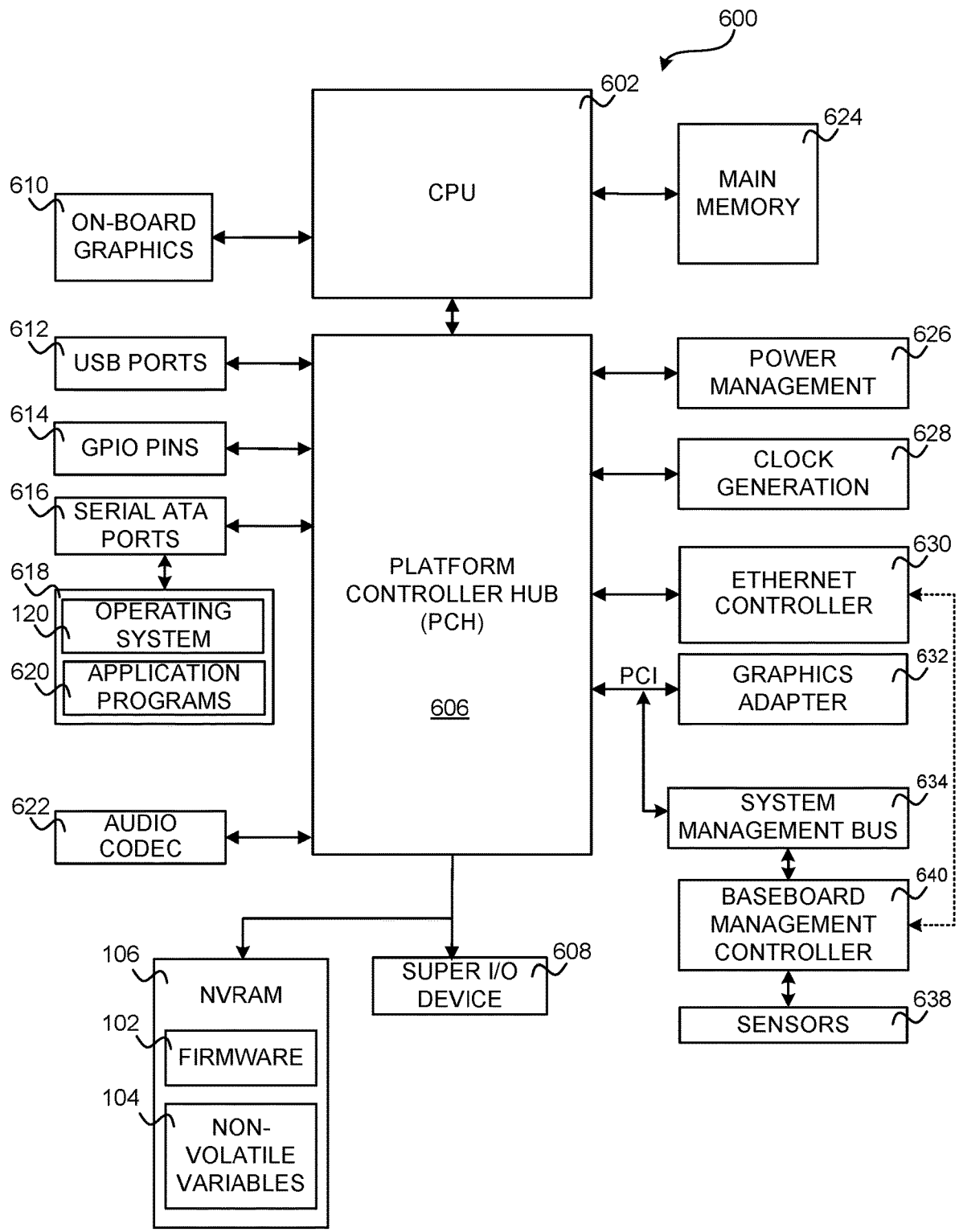
FIG. 6 is a computer architecture diagram that shows an illustrative architecture for a computer that can implement the technologies disclosed herein.

Referring now to FIG. 6, a computer architecture diagram that shows an illustrative architecture for a computer that can provide an operating environment for the technologies presented herein will be described. For example, and without limitation, the computer architecture shown in FIG. 6 can be utilized to implement a computing system that executes the firmware 102.

FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can implement the technologies described herein. The illustrative computer architecture shown in FIG. 6 includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a RAM used as the main memory 624 in the computer 600 and, possibly, to an on-board graphics adapter 610. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, an Ethernet Controller 630, and one or more general purpose input/output ("GPIO") pins 614. The USB ports 612 can include USB 2.0 ports, USB 3.0 ports and USB 3.1 ports among other USB ports.

The PCH 606 can also include functionality for providing networking functionality through an Ethernet Controller 630. The Ethernet Controller 630 is capable of connecting the computer 600 to another computer via a network. Connections which can be made by the Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to one configuration, the PCH 606 includes a serial advanced technology attachment ("SATA") adapter for providing one or more serial ATA ports 616. The serial ATA ports 616 can be connected to one or more mass storage devices storing an OS, such as OS 120 and application programs 620, such as a SATA disk drive 618. As known to those skilled in the art, an OS 120 comprises a set of programs that control operations of a computer and allocation of resources. An application program is software that runs on top of the operating system 120, or other runtime environment, and uses computer resources to perform application specific tasks desired by the user.

According to one configuration, the OS 120 comprises the LINUX operating system. According to another configuration, the OS 120 comprises the WINDOWS operating system from MICROSOFT CORPORATION. According to another configuration, the OS 120 comprises the UNIX operating system or one of its variants. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 642 for storing firmware 102 that includes program code containing the basic routines that help to start up the computer 600 and to transfer information between elements within the computer 600 as discussed above.

It should be appreciated that the program modules disclosed herein, including the firmware 102, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 106. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 606 can include a system management bus 634. The system management bus 634 can include a baseboard management controller ("BMC") 640. The BMC 640 is a microcontroller that monitors operation of the computer 600. The BMC 640 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 640 is communicatively connected to one or more components by way of the system management bus 634 in some configurations.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 640 functions as the master on the system management bus 634 in most circumstances but can also function as either a master or a slave in other circumstances. Each of the various components communicatively connected to the BMC 640 by way of the system management bus 634 is addressed using a slave address. The system management bus 634 is used by the BMC 640 to request and/or receive various operating and performance-related parameters from one or more components, such as the firmware 102, which are also communicatively connected to the system management bus 634.

It should be appreciated that the functionality provided by the computer 600 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 600 might not include all the components shown in FIG. 6, can include other components that are not explicitly shown in FIG. 6, or might utilize an architecture completely different than that shown in FIG. 6.

Based on the foregoing, it should be appreciated that technologies for performant and secure storage and retrieval of firmware variables and other types of data have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
   receiving a request at a first firmware component executing in a secure memory to store first data in a non-volatile memory;
   responsive to the request to store the first data in the non-volatile memory, storing, by the first firmware component, the first data in the non-volatile memory and in a first buffer located in the secure memory;
   copying, by the first firmware component, contents of the first buffer located in the secure memory to a non-secure memory accessible to a second firmware component executing in the non-secure memory;
   providing, by the first firmware component, an indication to the second firmware component executing in the non-secure memory indicating that the first buffer located in the non-secure memory has been updated; and
   updating, by the second firmware component, one or more data structures internal to the second firmware component executing in the non-secure memory responsive to the indication that the first buffer located in the non-secure memory has been updated, whereby the second firmware component responds to requests to retrieve the first data without accessing the first buffer located in the secure memory.

2. The computer-implemented method of claim 1, further comprising:
   receiving a request at the first firmware component executing in the secure memory to store second data in the secure memory;
   responsive to the request to store the second data in the secure memory, storing, by the first firmware component, the second data in a second buffer located in the secure memory;
   copying, by the first firmware component, contents of the second buffer located in the secure memory to the non-secure memory accessible to the second firmware component executing in the non-secure memory;
   providing, by the first firmware component, an indication to the second firmware component executing in the non-secure memory indicating that the second buffer located in the non-secure memory has been updated; and updating, by the second firmware component, the one or more data structures internal to the second firmware component executing in the non-secure memory responsive to the indication that the second buffer located in the non-secure memory has been updated, whereby the second firmware component responds to requests to retrieve the second data without accessing the second buffer located in the secure memory.

3. The computer-implemented method of claim 2, wherein the request to store the first data in the non-volatile memory or the request to store the second data in the secure memory is received at the second firmware component executing in the non-secure memory and forwarded to the first firmware component executing in the secure memory.

4. The computer-implemented method of claim 2, wherein the first data stored in the first buffer located in the secure memory and the second data stored in the second buffer located in the secure memory comprise firmware variables.

5. The computer-implemented method of claim 2, further comprising:
receiving a request at the second firmware component to retrieve at least a portion of the first data stored in the first buffer located in the non-secure memory or at least a portion of the second data stored in the second buffer located in the non-secure memory;
responsive to the request to retrieve the at least a portion of the first data or the at least a portion of the second data, retrieving the at least a portion of the first data from the first buffer located in the non-secure memory or the at least a portion of the second data from the second buffer located in the non-secure memory; and
returning the retrieved at least a portion of the first data or the retrieved at least a portion of the second data responsive to the request to retrieve the at least a portion of the first data or the at least a portion of the second data.

6. The computer-implemented method of claim 2, further comprising:
determining, by way of the first firmware component executing in the secure memory, if the second firmware component executing in the non-secure memory has requested a shutdown; and
responsive to determining the second firmware component executing in the non-secure memory has requested a shutdown, discontinuing synchronization of the first and second buffers located in the secure memory.

7. The computer-implemented method of claim 2, further comprising:
determining, by way of the first firmware component executing in the secure memory, if a size of the non-volatile memory has changed; and
responsive to determining the size of the non-volatile memory has changed, providing an indication to the second firmware component executing in the non-secure memory to discontinue synchronization of the first and second buffers located in the secure memory.

8. A non-transitory computer-readable storage medium having computer-executable instructions stored thereupon which, when executed by a computing system, cause the computing system to:
receive a request at a first firmware component executing in a secure memory to store first data in a non-volatile memory;

responsive to the request to store the first data in the non-volatile memory, store, by the first firmware component, the first data in the non-volatile memory and in a first buffer located in the secure memory;
copy, by the first firmware component, contents of the first buffer located in the secure memory to a non-secure memory accessible to a second firmware component executing in the non-secure memory;
provide, by the first firmware component, an indication to the second firmware component executing in the non-secure memory indicating that the first buffer located in the non-secure memory has been updated; and
update, by the second firmware component, one or more data structures internal to the second firmware component executing in the non-secure memory responsive to the indication that the first buffer located in the non-secure memory has been updated, whereby the second firmware component responds to requests to retrieve the first data without accessing the first buffer located in the secure memory.

9. The non-transitory computer-readable storage medium of claim 8, wherein the non-transitory computer-readable storage medium has further computer-executable instructions stored thereupon which, when executed by the computing system, cause the computing system to:
receive a request at the first firmware component executing in the secure memory to store second data in the secure memory;
responsive to the request to store the second data in the secure memory, store, by the first firmware component, the second data in a second buffer located in the secure memory;
copy, by the first firmware component, contents of the second buffer located in the secure memory to the non-secure memory accessible to the second firmware component executing in the non-secure memory;
provide, by the first firmware component, an indication to the second firmware component executing in the non-secure memory indicating that the second buffer located in the non-secure memory has been updated; and
update, by the second firmware component, the one or more data structures internal to the second firmware component executing in the non-secure memory responsive to the indication that the second buffer located in the non-secure memory has been updated, whereby the second firmware component responds to requests to retrieve the second data without accessing the second buffer located in the secure memory.

10. The non-transitory computer-readable storage medium of claim 9, wherein the request to store the first data in the non-volatile memory or the request to store the second data in the secure memory is received at the second firmware component executing in the non-secure memory and forwarded to the first firmware component executing in the secure memory.

11. The non-transitory computer-readable storage medium of claim 9, wherein the first data stored in the first buffer located in the secure memory and the second data stored in the second buffer located in the secure memory comprise firmware variables.

12. The non-transitory computer-readable storage medium of claim 9, wherein the non-transitory computer-readable storage medium has further computer-executable instructions stored thereupon which, when executed by the computing system, cause the computing system to:

receive a request at the second firmware component to retrieve at least a portion of the first data stored in the first buffer located in the non-secure memory or at least a portion of the second data stored in the second buffer located in the non-secure memory;

responsive to the request to retrieve the at least a portion of the first data or the at least a portion of the second data, retrieve the at least a portion of the first data from the first buffer located in the non-secure memory or the at least a portion of the second data from the second buffer located in the non-secure memory; and return the retrieved at least a portion of the first data or the retrieved at least a portion of the second data responsive to the request to retrieve the at least a portion of the first data or the at least a portion of the second data.

13. The non-transitory computer-readable storage medium of claim 9, wherein the non-transitory computer-readable storage medium has further computer-executable instructions stored thereupon which, when executed by the computing system, cause the computing system to:

determine, by way of the first firmware component executing in the secure memory, if the second firmware component executing in the non-secure memory has requested a shutdown; and responsive to determining the second firmware component executing in the non-secure memory has requested a shutdown, discontinue synchronization of the first and second buffers located in the secure memory.

14. The non-transitory computer-readable storage medium of claim 9, wherein the non-transitory computer-readable storage medium has further computer-executable instructions stored thereupon which, when executed by the computing system, cause the computing system to:

determine, by way of the first firmware component executing in the secure memory, if a size of the non-volatile memory has changed; and responsive to determining the size of the non-volatile memory has changed, provide an indication to the second firmware component executing in the non-secure memory to discontinue synchronization of the first and second buffers located in the secure memory.

15. A computing system, comprising:
one or more processors;
a secure memory;
a non-secure memory;
a non-volatile memory; and
at least one non-transitory computer-readable storage medium having computer-executable instructions stored thereupon which, when executed by the one or more processors, cause the computing system to:
receive a request at a first firmware component executing in the secure memory to store first data in the non-volatile memory;
responsive to the request to store the first data in the non-volatile memory, store, by the first firmware component, the first data in the non-volatile memory and in a first buffer located in the secure memory;
copy, by the first firmware component, contents of the first buffer located in the secure memory to the non-secure memory accessible to a second firmware component executing in the non-secure memory;
provide, by the first firmware component, an indication to the second firmware component executing in the non-secure memory indicating that the first buffer located in the non-secure memory has been updated; and update, by the second firmware component, one or more data structures internal to the second firmware component executing in the non-secure memory responsive to the indication that the first buffer located in the non-secure memory has been updated, whereby the second firmware component responds to requests to retrieve the first data without accessing the first buffer located in the secure memory.

16. The computing system of claim 15, wherein the non-transitory computer-readable storage medium has further computer-executable instructions stored thereupon which, when executed by the one or more processors, cause the computing system to:

receive a request at the first firmware component executing in the secure memory to store second data in the secure memory;

responsive to the request to store the second data in the secure memory, store, by the first firmware component, the second data in a second buffer located in the secure memory;

copy, by the first firmware component, contents of the second buffer located in the secure memory to the non-secure memory accessible to the second firmware component executing in the non-secure memory;

provide, by the first firmware component, an indication to the second firmware component executing in the non-secure memory indicating that the second buffer located in the non-secure memory has been updated; and update, by the second firmware component, the one or more data structures internal to the second firmware component executing in the non-secure memory responsive to the indication that the second buffer located in the non-secure memory has been updated, whereby the second firmware component responds to requests to retrieve the second data without accessing the second buffer located in the secure memory.

17. The computing system of claim 16, wherein the request to store the first data in the non-volatile memory or the request to store the second data in the secure memory is received at the second firmware component executing in the non-secure memory and forwarded to the first firmware component executing in the secure memory.

18. The computing system of claim 16, wherein the first data stored in the first buffer located in the secure memory and the second data stored in the second buffer located in the secure memory comprise firmware variables.

19. The computing system of claim 16, wherein the non-transitory computer-readable storage medium has further computer-executable instructions stored thereupon which, when executed by the one or more processors, cause the computing system to:

receive a request at the second firmware component to retrieve at least a portion of the first data stored in the first buffer located in the non-secure memory or at least a portion of the second data stored in the second buffer located in the non-secure memory;

responsive to the request to retrieve the at least a portion of the first data or the at least a portion of the second data, retrieve the at least a portion of the first data from the first buffer located in the non-secure memory or the at least a portion of the second data from the second buffer located in the non-secure memory; and return the retrieved at least a portion of the first data or the retrieved at least a portion of the second data responsive to the request to retrieve the at least a portion of the first data or the at least a portion of the second data.

20. The computing system of claim 16, wherein the non-transitory computer-readable storage medium has further computer-executable instructions stored thereupon which, when executed by the one or more processors, cause the computing system to:
  determine, by way of the first firmware component executing in the secure memory, if the second firmware component executing in the non-secure memory has requested a shutdown; and
  responsive to determining the second firmware component executing in the non-secure memory has requested a shutdown, discontinue synchronization of the first and second buffers located in the secure memory.

* * * * *